US012293894B2

(12) United States Patent
Greenland et al.

(10) Patent No.: US 12,293,894 B2
(45) Date of Patent: May 6, 2025

(54) X-RAY SOURCE SHIELDING

(71) Applicant: Moxtek, Inc., Orem, UT (US)

(72) Inventors: Kasey Otho Greenland, South Jordan, UT (US); Todd S. Parker, Kaysville, UT (US)

(73) Assignee: Moxtek, Inc., Orem, UT (US)

(*) Notice: Subject to any disclaimer, the term of this patent is extended or adjusted under 35 U.S.C. 154(b) by 136 days.

(21) Appl. No.: 18/464,485

(22) Filed: Sep. 11, 2023

(65) Prior Publication Data

US 2024/0120167 A1 Apr. 11, 2024

Related U.S. Application Data

(60) Provisional application No. 63/415,195, filed on Oct. 11, 2022.

(51) Int. Cl.
*H01J 35/16* (2006.01)

(52) U.S. Cl.
CPC ......... *H01J 35/16* (2013.01); *H01J 2235/165* (2013.01)

(58) Field of Classification Search
CPC ................. H01J 35/16; H01J 2235/165; H01J 2235/166; H01J 35/06; H01J 35/18; H01J 35/066; H01J 35/08; H01J 35/14; H01J 35/24; H01J 2235/086; H01J 35/112; H01J 2235/0233; H01J 35/116; H01J 35/147; H01J 35/153; H01J 35/165; H01J 37/063; H01J 37/065; H01J 37/15; H01J 37/21; H01J 2229/4813; H01J 2229/4831; H01J 2229/70; H01J 2229/8901; H01J 2237/032; H01J 2237/083; H01J 2237/2482; H01J 35/064; H01J 35/186; H01J 37/165; H01J 2235/081; H01J 2235/083; H01J 2235/084; H01J 2235/183; H01J 2235/18; H01J 35/10; H01J 35/106; H01J 2235/1245; H01J 2235/1262; H01J 35/02; H01J 35/04; H05G 1/02; H05G 1/10; H05G 1/52; H05G 1/025; H05G 1/04; A61B 6/582; G01N 23/223; G01N 2223/076; G01R 31/304
USPC .......................................................... 378/203
See application file for complete search history.

(56) References Cited

U.S. PATENT DOCUMENTS

| | | | | |
|---|---|---|---|---|
| 2013/0016812 A1* | 1/2013 | Yanagisawa | ............. | G21K 1/02 378/140 |
| 2017/0200580 A1* | 7/2017 | Miller | ..................... | H01J 35/116 |
| 2017/0287673 A1* | 10/2017 | Peterson | ............... | H01J 35/186 |
| 2019/0132936 A1* | 5/2019 | Steck | ..................... | H01J 35/112 |

* cited by examiner

*Primary Examiner* — Irakli Kiknadze
(74) *Attorney, Agent, or Firm* — Thorpe North & Western, LLP

(57) ABSTRACT

As an x-ray tube expands and contracts during heating and cooling, its hermetic seal can be damaged. A more robust hermetic seal, particularly as the x-ray tube is heated and cooled, is desirable. The x-ray tube described herein can include a proximal-housing 13 and a distal-housing 14, which can be connected to each other by an interface-ring 15 for improved hermetic seal. Added x-ray tube weight, of material used for blocking x-rays, can make it difficult to transport the x-ray tube. Reducing this weight is desirable. A maximum outer diameter Dp of the proximal-housing 13 can be greater than a maximum outer diameter Dd of the distal-housing 14, for improved blocking of x-rays. This diameter difference can allow improved x-ray shielding with less material.

20 Claims, 2 Drawing Sheets

X-RAY SOURCE SHIELDING

CLAIM OF PRIORITY

This application claims priority to U.S. Provisional Patent Application No. 63/415,195, filed on Oct. 11, 2022, which is incorporated herein by reference.

FIELD OF THE INVENTION

The present application is related to x-ray sources.

BACKGROUND

X-rays have many uses, including imaging, x-ray fluorescence analysis, x-ray diffraction analysis, and electrostatic dissipation. A large voltage between a cathode and an anode of an x-ray tube, and sometimes a heated filament, can cause electrons to emit from the cathode to the anode. The anode can include a target material. The target material can generate x-rays in response to impinging electrons from the cathode.

BRIEF DESCRIPTION OF THE DRAWINGS (DRAWINGS MIGHT NOT BE DRAWN TO SCALE)

Figure 1:
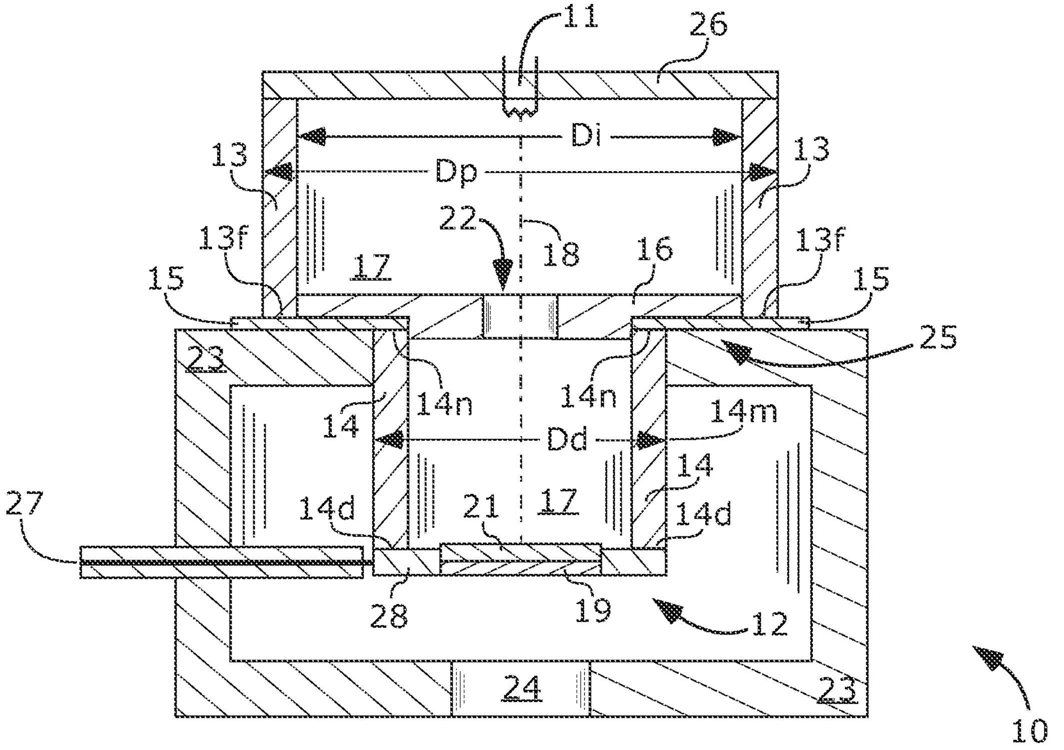

FIG. 1 is a cross-sectional side-view of a transmission-target x-ray tube 10. X-ray tube 10 can include a proximal-housing 13 and a distal-housing 14 hermetically sealed by an interface-ring ring 15. A maximum outer diameter Dp of the proximal-housing 13 can be greater than a maximum outer diameter Dd of the distal-housing 14 (Dp>Dd).

Figure 2:
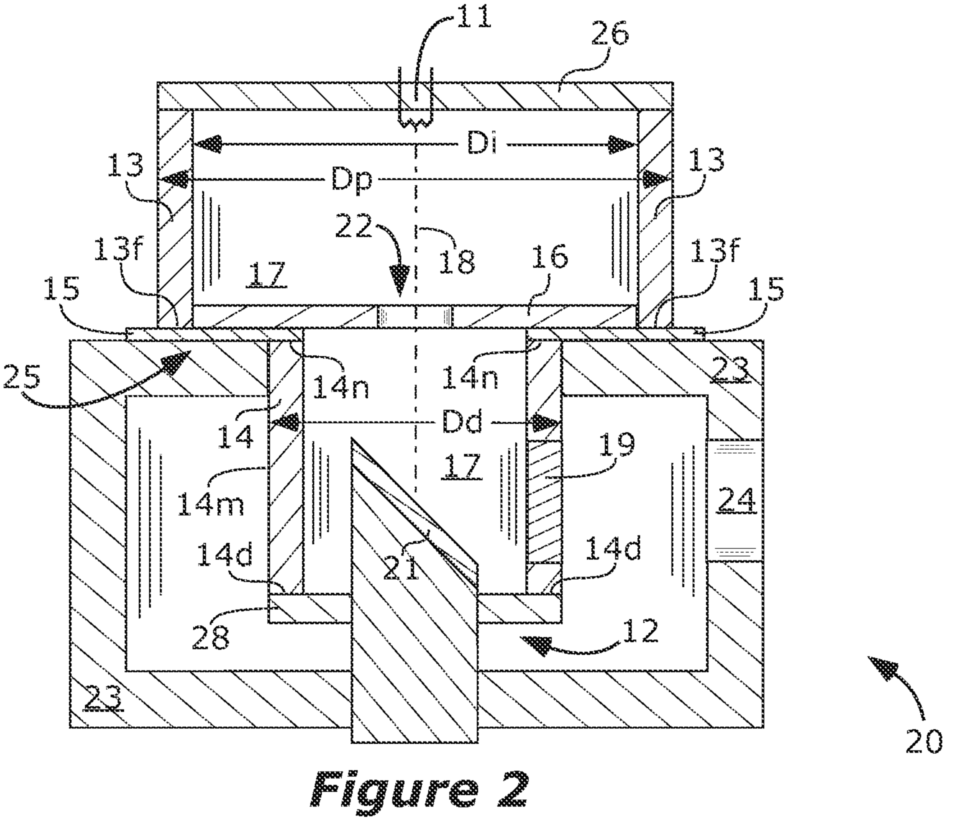

FIG. 2 is a cross-sectional side-view of a reflection-target, and side-window x-ray tube 20. X-ray tube 20 can include a proximal-housing 13 and a distal-housing 14 hermetically sealed by an interface-ring 15. A maximum outer diameter Dp of the proximal-housing 13 can be greater than a maximum outer diameter Dd of the distal-housing 14 (Dp>Dd).

Figure 3:
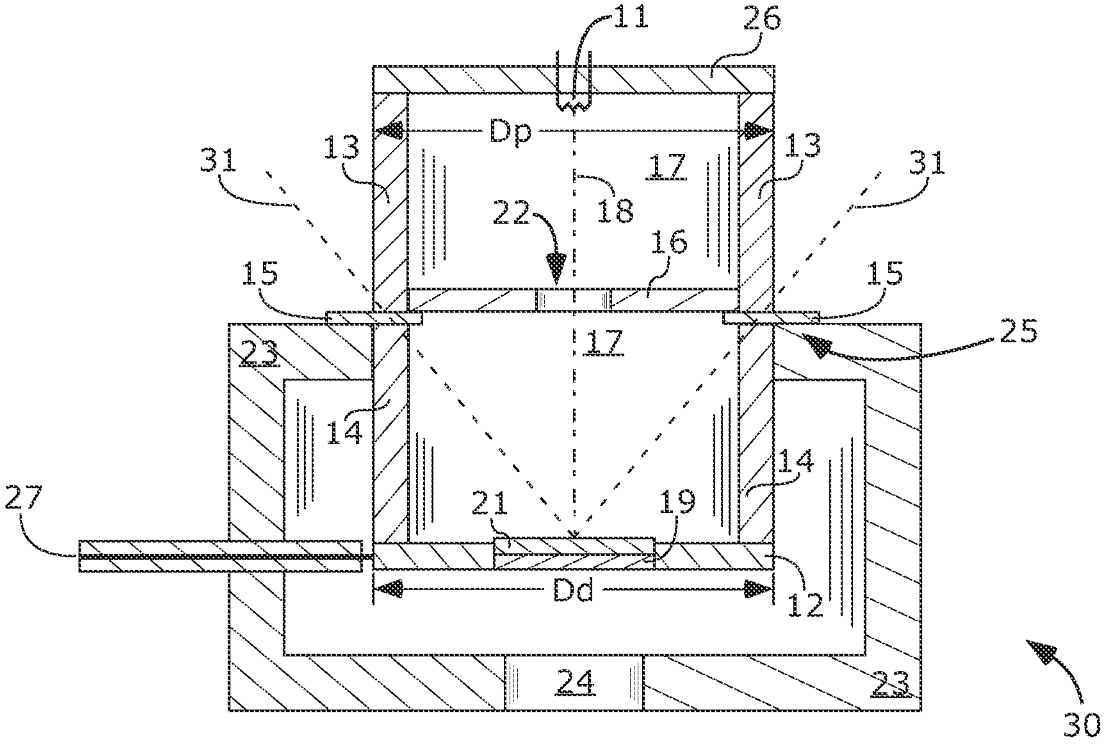

FIG. 3 is a cross-sectional side-view of a transmission-target x-ray tube 30. X-ray tube 30 can include a proximal-housing 13 and a distal-housing 14 hermetically sealed by an interface-ring 15. A maximum outer diameter Dp of the proximal-housing 13 can be less than or equal to a maximum outer diameter Dd of the distal-housing 14 (Dp≤Dd).

REFERENCE NUMBERS IN THE DRAWINGS x-ray tube 10, 20, 30
cathode 11
anode 12
proximal-housing 13
far-end **13*f***
distal-housing 14
distal-end **14*d***
near-end **14*n***
interface-ring 15
blocking-ring 16
internal-cavity 17
straight-line-axis 18
target 21
hermetic-seal 25
hole 22
blocking-enclosure 23
opening 24
structure 26 structure 28
wire 27
x-rays 31
minimum inner diameter Di
maximum outer diameter Dp
maximum outer diameter Dd Definitions. The following definitions, including plurals of the same, apply throughout this patent application.

As used herein, the terms "adjacent, "on", "located on", "located at", and "located over" mean on or nearby. The terms "located directly on", "adjoin", "adjoins", and ~adjoining" mean direct and immediate contact.

As used herein, the term "x-ray tube" is not limited to tubular/cylindrical shaped devices. The term "tube" is used because this is the standard term used for x-ray emitting devices.

As used herein, the term "+/−" means plus or minus. Thus, "53+/−5" means 48-58.

Unless explicitly noted otherwise herein, all temperature-dependent values are such values at 25° C.

DETAILED DESCRIPTION

X-rays, generated in an x-ray tube, can emit in all directions. It is normally desirable to block x-rays emitted in undesirable directions, and allow x-rays to emit only in a desired direction. Material used for blocking these x-rays can be heavy. The weight of the shielding materials can be particularly problematic for hand-held x-ray sources. The invention herein improves x-ray tube shielding with less weight, which is ergonomically advantageous.

X-ray tubes can be hermetically-sealed with an internal vacuum. As the x-ray tube expands and contracts during heating and cooling, the hermetic seal can be damaged, thus causing the x-ray tube to lose vacuum and fail. This heating and cooling can occur during manufacturing braze sealing or during operation of the x-ray tube. The invention herein provides a more robust hermetic seal, particularly as the x-ray tube is heated and cooled. Thus, the x-ray tube designs herein can have a longer life, which saves cost and minimizes adverse impact on the environment, due to less waste.

As illustrated in FIGS. 1-3, x-ray tubes 10, 20, and 30 are shown comprising a cathode 11 and an anode 12 electrically insulated from one another. The cathode 11 can be configured (e.g. with a filament) to emit electrons towards the anode 12. The anode 12 can include a target 21 which can generate x-rays in response to impinging electrons from the cathode 11. The x-ray tubes 10, 20, and 30 can be bipolar, with the cathode 11 operated at a large, negative voltage, and the anode 12 operated at a large, positive voltage.

The x-ray tubes 10, 20, and 30 can include a proximal-housing 13 and a distal-housing 14. The proximal-housing 13 can be located closer to the cathode 11, and the distal-housing 14 can be located farther from the cathode 11. The proximal-housing 13 and the distal-housing 14 can be separate components, spaced apart from each other.

An internal-cavity 17 can extend through a core of the proximal-housing 13 and the distal-housing 14. The internal-cavity 17 can be aligned for a straight-line-axis 18 to extend from an electron-emitter at the cathode 11, through the internal-cavity 17, to a target 21 at the anode 12. The internal-cavity 17 can be unobstructed by any solid material along the straight-line-axis 18.

The proximal-housing 13 can have a far-end **13*f* that is farthest from the cathode 11. The distal-housing 14 can have a near-end 14*n* that is nearest to the cathode 11. The proximal-housing 13 and the distal-housing 14 can be connected to each other by a hermetic-seal 25 at the far-end 13***f* of the proximal-housing 13 and the near-end 14*n* of the distal-housing 14.

The hermetic-seal 25 can include an interface-ring 15 bonded to and between the proximal-housing 13 and the distal-housing 14. The interface-ring 15 can have a coefficient of thermal expansion (CTEr) that is similar to a coefficient of thermal expansion (CTEp) of the proximal-housing 13 and/or that is similar to a coefficient of thermal expansion (CTEd) of the distal-housing 14. Thus, the interface-ring 15 can expand and contract with the proximal-housing 13 and the distal-housing 14 during heating and cooling. This can reduce failure of the hermetic-seal 25.

For example, $0.3 \leq CTEr/CTEp$, $0.5 \leq CTEr/CTEp$, or $0.7 \leq CTEr/CTEp$; $CTEr/CTEp \leq 1.4$, $CTEr/CTEp \leq 2$, or $CTEr/CTEp \leq 3.3$; $0.3 \leq CTEr/CTEd$, $0.5 \leq CTEr/CTEd$, or $0.7 \leq CTEr/CTEd$; and/or $CTEr/CTEd \leq 1.4$, $CTEr/CTEd \leq 2$, or $CTEr/CTEd \leq 3.3$.

The proximal-housing 13 and the distal-housing 14 can be made of glass or ceramic. The interface-ring 15 can include at least 95 weight percent iron, nickel, and cobalt. The interface-ring 15 can include 53+/−5 weight percent iron, 29+/−5 weight percent nickel, 17+/−5 weight percent cobalt, and total weight percent of all chemical elements equal to 100%. Other materials, such as copper or nickel can have a compatible coefficient of thermal expansion and other acceptable physical characteristics. The interface-ring 15 can include copper, nickel, or both.

The x-ray tubes 10, 20, and 30 can further comprise a blocking-ring 16. The blocking-ring 16 can be proximate to, adjacent to, or can adjoin, the interface-ring 15. For better blocking of x-rays, the blocking-ring 16 can be closer to the cathode 11 than the interface-ring 15. Alternatively, the interface-ring 15 can be closer to the cathode 11 than the blocking-ring 16. The blocking-ring 16 can be encircled by the proximal-housing 13, by the distal-housing 14, or by both. As illustrated in FIGS. 1-2, a portion of the interface-ring 15 can be sandwiched between the blocking-ring 16 and the distal-housing 14, in a direction parallel to the straight-line-axis 18.

The blocking-ring 16 can include a material with a high atomic number, such as for example at least 72. It is preferable that the blocking-ring 16 includes tungsten, because tungsten is effective at blocking x-rays, and is also compatible with the vacuum within the x-ray tube. It is preferable that the blocking-ring 16 does not include lead because lead can be incompatible with the internal vacuum of the x-ray tube. For X-ray tubes which operate at intermediate energy levels, the blocking ring could be made from lower atomic number materials, such as molybdenum or niobium. For X-ray tubes which operate at even lower energies, the blocking-ring 16 can include a material with a lower atomic number, such as for example at least 21 or at least 30.

There can be a hole 22 extending through the interface-ring 15 and the blocking-ring 16. The hole 22 can be aligned to allow electrons from the electron-emitter to pass through the hole 22 to the target 21. The straight-line-axis 18 can extend through the hole 22.

The x-ray tubes 10, 20, and 30 can also include a blocking-enclosure 23. The blocking-enclosure 23 can surround the distal-housing 14 except at its near-end 14*n*, at an opening 24 aligned for intended emission of x-rays, and at an entrance for a wire 27 for providing voltage to the anode 12 (FIGS. 1 & 3) or for the anode 12 (FIG. 2). A circular-portion of the interface-ring 15 can be sandwiched between the blocking-enclosure 23 and the proximal-housing 13. The blocking-enclosure 23, the blocking-ring 16, and the interface-ring 15 can be maintained at ground voltage during operation.

The distal-housing 14 can have a distal-end 14*d* farthest from the cathode 11 and a midpoint 14*m* that is half-way between the near-end 14*n* and the distal-end 14*d* of the distal-housing 14. The blocking-enclosure 23 can be spaced apart from the distal-housing 14 from the midpoint 14*m* to the distal-end 14*d* of the distal-housing 14. The blocking-enclosure 23 can adjoin the distal-housing 14 at its near-end 14*n*.

The blocking-enclosure 23 can be configured to block x-rays in undesirable directions. Thus, the blocking-enclosure 23 can include a material with an atomic number of at least 72. Example materials of the blocking-enclosure 23 include lead, tungsten, or both. The lead and/or tungsten can be suspended in a carrier material such as a polymer or metal matrix for casting or molding of the blocking-enclosure 23. The blocking-enclosure 23 can be electrically insulative or can be electrically conductive.

As illustrated in FIGS. 1-2, a maximum outer diameter Dp of the proximal-housing 13 can be greater than a maximum outer diameter Dd of the distal-housing 14 ($Dp > Dd$). This relationship can improve blocking of x-rays generated at the target 21. If, as illustrated in FIG. 3, the proximal-housing 13 and the distal-housing 14 have the same diameter ($Dp = Dd$), then x-rays 31 can more easily escape through the distal-housing 14, the proximal-housing 13, and the interface-ring 15. The result can be similar if the proximal-housing 13 has a smaller diameter than the distal-housing 14 ($Dp < Dd$). Therefore, it is preferable for the proximal-housing 13 to have a greater diameter than the distal-housing 14 ($Dp > Dd$), as illustrated in FIGS. 1-2.

Example preferred relationships between the maximum outer diameter Dp of the proximal-housing 13 and the maximum outer diameter Dd of the distal-housing 14 include the following: $Dp/Dd \geq 1.1$, $Dp/Dd \geq 1.25$, or $Dp/Dd \geq 1.5$; and/or $Dp/Dd \leq 2.5$, $Dp/Dd \leq 4$, or $Dp/Dd \leq 10$.

For improved blocking of x-rays, it is preferable for a minimum inner diameter Di of the proximal-housing 13 to be greater than the maximum outer diameter Dd of the distal-housing 14 ($Di > Dd$).

Example preferred relationships between the minimum inner diameter Di of the proximal-housing 13 and the maximum outer diameter Dd of the distal-housing 14 include the following: $Di/Dd \geq 1.05$, $Dp/Dd \geq 1.15$, or $Dp/Dd \geq 1.25$.

Due to the overall configuration of the x-ray tube, with a smaller outer diameter Dp of the proximal-housing 13, and with the blocking-enclosure 23, a large percent of x-rays can be blocked, except those emitted through the opening 24. For example, at least 75%, at least 90%, or at least 99% of x-rays generated in the target can be blocked from escaping the x-ray tube except through the opening 24.

The cathode 11 and the anode 12 can be electrically insulated from one another by the proximal-housing 13 and by the distal-housing 14. Thus, the proximal-housing 13 and the distal-housing 14 can be electrically insulative. The proximal-housing 13 and the distal-housing 14 can be ceramic or glass. In this example, structure 26 can be part of the cathode, structure 28 can be part of the anode, and both can be electrically conductive.

Alternatively, the proximal-housing 13 and the distal-housing 14 can be electrically conductive. The proximal-housing 13 and the distal-housing 14 can be metallic. In this example, structure 26 and structure 28 can be electrically insulative.

What is claimed is:

1. An x-ray tube comprising:

a cathode and an anode electrically insulated from one another, the cathode configured to emit electrons towards the anode, and the anode configured to emit x-rays out of the x-ray tube in response to impinging electrons from the cathode;

a proximal-housing and a distal-housing, the proximal-housing is located closer to the cathode and the distal-housing is located farther from the cathode, the proximal-housing and the distal-housing are separate components, spaced apart from each other;

an internal-cavity extends through a core of the proximal-housing and the distal-housing, the internal-cavity is aligned for a straight-line-axis to extend from an electron-emitter at the cathode, through the internal-cavity, to a target at the anode;

the proximal-housing has a far-end that is farthest from the cathode, the distal-housing has a near-end that is nearest to the cathode, and the proximal-housing and the distal-housing are connected to each other by a hermetic-seal at the far-end of the proximal-housing and the near-end of the distal-housing;

the hermetic-seal includes an interface-ring bonded to and between the proximal-housing and the distal-housing;

$Dp/Dd \geq 1.25$, where Dp is a maximum outer diameter of the proximal-housing and Dd is a maximum outer diameter of the distal-housing;

$0.5 \leq CTEr/CTEp \leq 2$ and $0.5 \leq CTEr/CTEd \leq 2$, where CTEr is a coefficient of thermal expansion of the interface-ring, CTEp is a coefficient of thermal expansion of the proximal-housing, and CTEd is a coefficient of thermal expansion of the distal-housing a blocking-ring located proximate to the interface-ring, the blocking-ring includes a material with an atomic number of at least 72;

a hole extending through the interface-ring and the blocking-ring, the hole aligned to allow electrons from the electron-emitter to pass through the hole to the target;

a blocking-enclosure surrounding the distal-housing except at the near-end and except at an opening aligned for intended emission of x-rays;

the blocking-enclosure includes a material with an atomic number of at least 72;

at least 90% of x-rays generated in the target are blocked from escaping the x-ray tube except through the opening; and a circular-portion of the interface-ring is sandwiched between the blocking-enclosure and the proximal-housing.

2. An x-ray tube comprising:

a cathode and an anode electrically insulated from one another, the cathode configured to emit electrons towards the anode, and the anode configured to emit x-rays out of the x-ray tube in response to impinging electrons from the cathode;

a proximal-housing and a distal-housing, the proximal-housing is located closer to the cathode and the distal-housing is located farther from the cathode, the proximal-housing and the distal-housing are separate components, spaced apart from each other;

an internal-cavity extends through a core of the proximal-housing and the distal-housing, the internal-cavity is aligned for a straight-line-axis to extend from an electron-emitter at the cathode, through the internal-cavity, to a target at the anode;

the proximal-housing has a far-end that is farthest from the cathode, the distal-housing has a near-end that is nearest to the cathode, and the proximal-housing and the distal-housing are connected to each other by a hermetic-seal at the far-end of the proximal-housing and the near-end of the distal-housing;

the hermetic-seal includes an interface-ring bonded to and between the proximal-housing and the distal-housing;

$Dp > Dd$, where Dp is a maximum outer diameter of the proximal-housing and Dd is a maximum outer diameter of the distal-housing;

a blocking-ring located proximate to the interface-ring, the blocking-ring includes a material with an atomic number of at least 72; and a hole extending through the interface-ring and the blocking-ring, the hole aligned to allow electrons from the electron-emitter to pass through the hole to the target.

3. The x-ray tube of claim 2, further comprising:

a blocking-enclosure surrounding the distal-housing except at the near-end and except at an opening aligned for intended emission of x-rays; and the blocking-enclosure includes a material with an atomic number of at least 72.

4. The x-ray tube of claim 3, wherein the blocking-enclosure, the blocking-ring, and the interface-ring are maintained at ground voltage during operation.

5. The x-ray tube of claim 3, wherein at least 90% of x-rays generated in the target are blocked from escaping the x-ray tube except through the opening.

6. The x-ray tube of claim 3, wherein a circular-portion of the interface-ring is sandwiched between the blocking-enclosure and the proximal-housing.

7. The x-ray tube of claim 3, wherein the blocking-enclosure includes lead, tungsten, or both.

8. The x-ray tube of claim 3, wherein:

the distal-housing has a distal-end farthest from the cathode and a midpoint that is half-way between the near-end and the distal-end of the distal-housing; and the blocking-enclosure is spaced apart from the distal-housing from the midpoint to the distal-end of the distal-housing.

9. The x-ray tube of claim 2, wherein the blocking-ring is closer to the cathode than the interface-ring, and a portion of the interface-ring is sandwiched between the blocking-ring and the distal-housing, in a direction parallel to the straight-line-axis.

10. The x-ray tube of claim 2, wherein the cathode and the anode are eclectically insulated from one another by the proximal-housing and the distal-housing, and the proximal-housing and the distal-housing are electrically insulative.

11. The x-ray tube of claim 2, wherein the proximal-housing and the distal-housing are electrically conductive.

12. The x-ray tube of claim 2, wherein $Di > Dd$, where Di is a minimum inner diameter of the proximal-housing.

13. The x-ray tube of claim 2, wherein the blocking-ring adjoins the interface-ring.

14. The x-ray tube of claim 2, wherein the blocking-ring includes tungsten without lead.

15. The x-ray tube of claim 2, wherein $Dp/Dd \geq 1.25$.

16. The x-ray tube of claim 2, wherein the interface-ring includes at least 95 weight percent iron, nickel, and cobalt.

17. The x-ray tube of claim 2, wherein $0.5 \leq CTEr/CTEp \leq 2$ and $0.5 \leq CTEr/CTEd \leq 2$, where CTEr is a coefficient of thermal expansion of the interface-ring, CTEp is a coefficient of thermal expansion of the proximal-housing, and CTEd is a coefficient of thermal expansion of the distal-housing.

18. The x-ray tube of claim 2, wherein the internal-cavity is unobstructed by any solid material along the straight-line-axis.

19. An x-ray tube comprising:

a cathode and an anode electrically insulated from one another, the cathode configured to emit electrons towards the anode, and the anode configured to emit x-rays out of the x-ray tube in response to impinging electrons from the cathode;

a proximal-housing and a distal-housing, the proximal-housing is located closer to the cathode and the distal-housing is located farther from the cathode, the proximal-housing and the distal-housing are separate components, spaced apart from each other;

an internal-cavity extends through a core of the proximal-housing and the distal-housing, the internal-cavity is aligned for a straight-line-axis to extend from an electron-emitter at the cathode, through the internal-cavity, to a target at the anode;

the proximal-housing has a far-end that is farthest from the cathode, the distal-housing has a near-end that is nearest to the cathode, and the proximal-housing and the distal-housing are connected to each other by a hermetic-seal at the far-end of the proximal-housing and the near-end of the distal-housing;

the hermetic-seal includes an interface-ring bonded to and between the proximal-housing and the distal-housing;

$D_p > D_d$, where $D_p$ is a maximum outer diameter of the proximal-housing and $D_d$ is a maximum outer diameter of the distal-housing;

a blocking-enclosure surrounding the distal-housing except at the near-end and except at an opening aligned for intended emission of x-rays; and the blocking-enclosure includes a material with an atomic number of at least 72.

20. The x-ray tube of claim 19, wherein $D_i > D_d$, where $D_i$ is a minimum inner diameter of the proximal-housing.

* * * * *